United States Patent
Ryba-White et al.

(10) Patent No.: US 9,320,926 B2
(45) Date of Patent: Apr. 26, 2016

(54) SOLAR PANEL FIRE SKIRT

(75) Inventors: Julian Ryba-White, San Francisco, CA (US); Damien Scott, Daly City, CA (US); Ben Tarbell, Palo Alto, CA (US)

(73) Assignee: SolarCity Corporation, San Mateo, CA (US)

( * ) Notice: Subject to any disclaimer, the term of this patent is extended or adjusted under 35 U.S.C. 154(b) by 904 days.

(21) Appl. No.: 13/535,892

(22) Filed: Jun. 28, 2012

(65) Prior Publication Data

US 2014/0000916 A1  Jan. 2, 2014

(51) Int. Cl.
- A62C 8/00 (2006.01)
- A62C 2/06 (2006.01)
- F24J 2/46 (2006.01)
- F24J 2/52 (2006.01)

(52) U.S. Cl.
CPC ............ *A62C 2/065* (2013.01); *F24J 2/4607* (2013.01); *F24J 2/5211* (2013.01); *F24J 2/5245* (2013.01)

(58) Field of Classification Search
USPC .......................................................... 169/48
See application file for complete search history.

(56) References Cited

U.S. PATENT DOCUMENTS

| | | | |
|---|---|---|---|
| 3,630,253 A | 12/1971 | Sherman | |
| 4,047,516 A | 9/1977 | Bruel et al. | |
| 4,112,922 A | 9/1978 | Skinner et al. | |
| 4,146,785 A | 3/1979 | Neale | |
| 4,154,223 A | 5/1979 | Lof | |
| 4,155,346 A | 5/1979 | Aresty | |
| 4,215,677 A | 8/1980 | Erickson | |
| 4,217,825 A | 8/1980 | Bruckner | |
| 4,219,011 A | 8/1980 | Knoos | |
| 4,271,825 A | 6/1981 | Schwob et al. | |
| 4,308,858 A | 1/1982 | Skillman | |
| 4,310,182 A | 1/1982 | Vandenbossche | |
| 4,312,325 A | 1/1982 | Voges et al. | |

(Continued)

FOREIGN PATENT DOCUMENTS

| | | | |
|---|---|---|---|
| DE | 3111969 A1 | 10/1982 | |
| DE | 4444439 A1 | 4/1995 | |

(Continued)

OTHER PUBLICATIONS

FM Global Property Loss Prevention Data Sheet 1-15 https://www.fmglobal.com/fmglobalregistration/Vshared/FMDS0115.pdf.*

(Continued)

*Primary Examiner* — Len Tran
*Assistant Examiner* — Adam J Rogers
(74) *Attorney, Agent, or Firm* — Kilpatrick Townsend & Stockton LLP

(57) ABSTRACT

Embodiments of the present invention are directed towards fire blocking apparatuses that include fire skirts that extend off edges of solar panels installed on roofs. The fire skirts are configured to block the gap between a solar panel and the roof surface on which it is installed to prevent or suppress the ignition for spreading of fire underneath the solar panel. Some of the fire skirts are heat or fire sensitive and are configured to the melt, deform, or otherwise be altered upon the application of a threshold temperature such that the fire skirts block the gap between the solar panel and the roof surface. Other embodiments are directed towards fire skirts that include a solar panel mounting surface and a shelf surface configured to accommodate ballast or fasteners to affix the solar panel to the roof surface. Such embodiments can be formed from pre-scored or pre-folded sheet materials.

19 Claims, 14 Drawing Sheets

(56) References Cited

U.S. PATENT DOCUMENTS

| | | |
|---|---|---|
| 4,353,356 A | 10/1982 | Vandenbossche |
| 4,371,139 A | 2/1983 | Clark |
| 4,429,872 A | 2/1984 | Capachi |
| 4,505,261 A | 3/1985 | Hunter |
| 4,570,408 A | 2/1986 | Frascaroli et al. |
| 4,680,905 A | 7/1987 | Rockar |
| 4,691,818 A | 9/1987 | Weber |
| 4,718,185 A | 1/1988 | Conlin et al. |
| 4,738,247 A | 4/1988 | Moore |
| 4,966,631 A | 10/1990 | Matlin et al. |
| 5,046,791 A | 9/1991 | Kooiman |
| 5,127,762 A | 7/1992 | Havlovitz |
| 5,134,827 A | 8/1992 | Hartman |
| 5,143,556 A | 9/1992 | Matlin |
| 5,144,780 A | 9/1992 | Gieling et al. |
| 5,164,019 A | 11/1992 | Sinton |
| 5,164,020 A | 11/1992 | Wagner et al. |
| 5,203,135 A | 4/1993 | Bastian |
| 5,205,694 A | 4/1993 | Nagoshi et al. |
| 5,232,518 A | 8/1993 | Nath et al. |
| 5,316,592 A | 5/1994 | Dinwoodie |
| 5,333,602 A | 8/1994 | Huang |
| 5,338,369 A | 8/1994 | Rawlings |
| 5,460,660 A | 10/1995 | Albright et al. |
| 5,497,587 A | 3/1996 | Hirai et al. |
| 5,505,265 A * | 4/1996 | O'Neil ............................ 169/48 |
| 5,505,788 A | 4/1996 | Dinwoodie |
| D374,169 S | 10/1996 | Kopish |
| 5,571,338 A | 11/1996 | Kadonome et al. |
| 5,596,981 A | 1/1997 | Soucy |
| 5,628,580 A | 5/1997 | Rinderer |
| D387,655 S | 12/1997 | Kopish |
| 5,706,617 A | 1/1998 | Hirai et al. |
| 5,746,029 A | 5/1998 | Ullman |
| 5,746,839 A | 5/1998 | Dinwoodie |
| 5,787,653 A | 8/1998 | Sakai et al. |
| 5,960,790 A | 10/1999 | Rich |
| 6,000,393 A | 12/1999 | Moore |
| 6,061,978 A | 5/2000 | Dinwoodie et al. |
| 6,093,884 A | 7/2000 | Toyomura et al. |
| 6,105,317 A | 8/2000 | Tomiuchi et al. |
| 6,111,189 A | 8/2000 | Garvison et al. |
| 6,148,570 A | 11/2000 | Dinwoodie et al. |
| 6,201,180 B1 | 3/2001 | Meyer et al. |
| 6,207,889 B1 | 3/2001 | Toyomura et al. |
| 6,269,596 B1 | 8/2001 | Ohtsuka et al. |
| 6,274,402 B1 | 8/2001 | Verlinden et al. |
| 6,295,918 B1 | 10/2001 | Simmons et al. |
| 6,313,395 B1 | 11/2001 | Crane et al. |
| 6,337,283 B1 | 1/2002 | Verlinden et al. |
| 6,360,491 B1 | 3/2002 | Ullman |
| 6,370,828 B1 | 4/2002 | Genschorek |
| 6,387,726 B1 | 5/2002 | Verlinden et al. |
| 6,423,568 B1 | 7/2002 | Verlinden et al. |
| 6,465,724 B1 | 10/2002 | Garvison et al. |
| 6,495,750 B1 | 12/2002 | Dinwoodie |
| 6,501,013 B1 | 12/2002 | Dinwoodie |
| 6,523,320 B2 | 2/2003 | Stoof |
| 6,534,702 B1 | 3/2003 | Makita et al. |
| 6,534,703 B2 | 3/2003 | Dinwoodie |
| 6,568,873 B1 | 5/2003 | Peterson |
| 6,570,084 B2 | 5/2003 | Dinwoodie |
| 6,586,668 B2 | 7/2003 | Shugar et al. |
| 6,634,077 B2 | 10/2003 | Layfield |
| 6,670,541 B2 | 12/2003 | Nagao et al. |
| 6,672,018 B2 | 1/2004 | Shingleton |
| 6,675,545 B2 | 1/2004 | Chen et al. |
| 6,675,580 B2 | 1/2004 | Ansley et al. |
| 6,676,326 B2 | 1/2004 | Wu |
| 6,722,357 B2 | 4/2004 | Shingleton |
| 6,761,008 B2 | 7/2004 | Chen et al. |
| 6,784,360 B2 | 8/2004 | Nakajima et al. |
| 6,809,251 B2 | 10/2004 | Dinwoodie |
| 6,809,253 B2 | 10/2004 | Dinwoodie |
| 6,935,623 B2 | 8/2005 | Cook et al. |
| D510,315 S | 10/2005 | Shugar et al. |
| D511,576 S | 11/2005 | Shingleton et al. |
| 6,959,517 B2 | 11/2005 | Poddany et al. |
| RE38,988 E | 2/2006 | Dinwoodie |
| 6,993,917 B2 | 2/2006 | Unger et al. |
| 7,043,884 B2 | 5/2006 | Moreno |
| 7,260,918 B2 | 8/2007 | Liebendorfer |
| 7,297,867 B2 | 11/2007 | Nomura et al. |
| 7,328,534 B2 | 2/2008 | Dinwoodie |
| 7,339,110 B1 | 3/2008 | Mulligan et al. |
| D565,505 S | 4/2008 | Shugar et al. |
| 7,406,800 B2 | 8/2008 | Cinnamon et al. |
| 7,435,134 B2 | 10/2008 | Lenox |
| 7,592,537 B1 | 9/2009 | West |
| 7,774,998 B2 | 8/2010 | Aschenbrenner |
| 7,797,889 B2 | 9/2010 | McClintock et al. |
| 7,806,377 B2 | 10/2010 | Strizki |
| 7,832,157 B2 | 11/2010 | Cinnamon |
| 7,866,098 B2 | 1/2011 | Cinnamon |
| 7,866,099 B2 | 1/2011 | Komamine et al. |
| 7,915,519 B2 | 3/2011 | Kobayashi |
| 7,956,281 B2 | 6/2011 | O'Brien et al. |
| 7,987,641 B2 | 8/2011 | Cinnamon |
| 8,039,733 B2 | 10/2011 | Kobayashi |
| 8,109,048 B2 | 2/2012 | West et al. |
| 8,459,251 B2 * | 6/2013 | Elmes et al. ................... 126/704 |
| 2002/0078991 A1 | 6/2002 | Nagao et al. |
| 2002/0112435 A1 | 8/2002 | Hartman |
| 2003/0010374 A1 | 1/2003 | Dinwoodie |
| 2003/0015636 A1 | 1/2003 | Liebendorfer |
| 2003/0015637 A1 | 1/2003 | Liebendorfer |
| 2003/0201009 A1 | 10/2003 | Nakajima et al. |
| 2004/0063265 A1 | 4/2004 | Noble |
| 2004/0123550 A1 * | 7/2004 | Hartman ...................... 52/720.1 |
| 2004/0163338 A1 | 8/2004 | Liebendorfer |
| 2004/0177577 A1 * | 9/2004 | Voegele et al. ................. 52/306 |
| 2004/0179892 A1 | 9/2004 | DuPreez |
| 2005/0115176 A1 | 6/2005 | Russell |
| 2005/0126621 A1 | 6/2005 | Dinwoodie et al. |
| 2005/0199278 A1 | 9/2005 | Aschenbrenner |
| 2005/0257453 A1 | 11/2005 | Cinnamon |
| 2006/0042680 A1 | 3/2006 | Korman et al. |
| 2006/0118163 A1 | 6/2006 | Plaisted et al. |
| 2007/0074755 A1 | 4/2007 | Eberspacher et al. |
| 2007/0102036 A1 | 5/2007 | Cinnamon |
| 2007/0131273 A1 | 6/2007 | Kobayashi |
| 2007/0157963 A1 | 7/2007 | Metten et al. |
| 2007/0199561 A1 | 8/2007 | Soucy |
| 2008/0000173 A1 | 1/2008 | Lenox et al. |
| 2008/0302407 A1 | 12/2008 | Kobayashi |
| 2009/0025314 A1 | 1/2009 | Komamine et al. |
| 2009/0078299 A1 | 3/2009 | Cinnamon et al. |
| 2009/0095280 A1 | 4/2009 | Buller et al. |
| 2009/0217964 A1 | 9/2009 | Gilmore et al. |
| 2009/0320906 A1 | 12/2009 | Botkin et al. |
| 2010/0147362 A1 | 6/2010 | King et al. |
| 2010/0154199 A1 | 6/2010 | Kobayashi |
| 2010/0155547 A1 | 6/2010 | Kobayashi |
| 2010/0179678 A1 | 7/2010 | Dinwoodie et al. |
| 2010/0206297 A1 | 8/2010 | Wilkinson |
| 2010/0218798 A1 | 9/2010 | Cinnamon et al. |
| 2010/0243023 A1 | 9/2010 | Patton et al. |
| 2011/0000153 A1 * | 1/2011 | Albert ........................... 52/173.3 |
| 2011/0016796 A1 * | 1/2011 | Foster et al. ................... 49/477.1 |
| 2011/0070765 A1 | 3/2011 | Kobayashi |
| 2011/0198304 A1 | 8/2011 | Wallgren |
| 2011/0214368 A1 | 9/2011 | Haddock et al. |
| 2011/0220180 A1 | 9/2011 | Cinnamon et al. |
| 2011/0232715 A1 | 9/2011 | Lenox et al. |
| 2012/0273618 A1 * | 11/2012 | Fernando et al. ............. 244/129.2 |
| 2012/0301661 A1 | 11/2012 | West et al. |

FOREIGN PATENT DOCUMENTS

| | | |
|---|---|---|
| DE | 29703481 U1 | 11/1997 |
| DE | 102005002828 A1 | 8/2006 |
| DE | 1020005002828 A1 | 8/2006 |
| GB | 2391704 A | 2/2004 |
| JP | 47-23570-01 | 7/1971 |

(56) References Cited

FOREIGN PATENT DOCUMENTS

| | | |
|---|---|---|
| JP | 47-057885 | 5/1972 |
| JP | 57-077856 | 5/1982 |
| JP | 357087561 A | 6/1982 |
| JP | 58-133945 U | 9/1983 |
| JP | 59-191748 | 12/1984 |
| JP | 02-42449 | 3/1990 |
| JP | 04-052367 | 2/1992 |
| JP | 06-41156 U | 5/1994 |
| JP | H 07202242 A | 8/1995 |
| JP | 8296311 A | 11/1996 |
| JP | 10-176403 | 6/1998 |
| JP | 410159284 A | 6/1998 |
| JP | 10-266499 | 10/1998 |
| JP | 10-317619 | 12/1998 |
| JP | 10-317621 | 12/1998 |
| JP | 11-002004 | 1/1999 |
| JP | 11-002011 | 1/1999 |
| JP | 11-006262 | 1/1999 |
| JP | 11-040835 | 2/1999 |
| JP | 411222991 A | 8/1999 |
| JP | 2000147262 | 5/2000 |
| JP | 2000150947 A | 5/2000 |
| JP | 2000345664 A | 12/2000 |
| JP | 2001148493 A | 5/2001 |
| JP | 2001210853 A | 8/2001 |
| JP | 2001291890 | 10/2001 |
| JP | 2002141541 A | 5/2002 |
| JP | 2002294957 A | 10/2002 |
| JP | 2003227207 A | 8/2003 |
| WO | WO 2005116359 A3 | 12/2005 |
| WO | WO 2007103882 A3 | 9/2007 |
| WO | WO 2010074701 A1 | 7/2010 |

OTHER PUBLICATIONS

Solarex Photovoltaic Modules (PhotoVLX PV); circa 1993; 3 pages.
Solyndra 200 Series Datasheet; Apr. 1, 2011; 2 pages.
Unirac Technical Bulletin 103; Code-Compliant SolarMount Installation; May 2002; 16 pages.
Unirac Installation Manual 210; Flush SolarMount SMR + CT Assembly; 2003; 6 pages.
U.S. Appl. No. 13/960,835, by inventors John Raymond West, et al.; Skirt and Other Devices for Photovoltaic Arrays (not yet published).
PCT International Search Report for Application No. PCT/US2009/060879, mailed Dec. 3, 2009, 25 pages.
Non-Final Office Action for U.S. Appl. No. 13/960,835, mailed Sep. 8, 2014, 7 pages.
Final Office Action for U.S. Appl. No. 13/960,835, mailed May 7, 2015, 11 pages.
US 5,819,447, 10/1998, Yamawaki (withdrawn)

* cited by examiner

SOLAR PANEL FIRE SKIRT

BACKGROUND

The present invention relates to equipment and accessories for flush and tilted roof installations of solar panels, and in particular, to devices, systems and methods of installation for fire suppression and prevention in roof mounted solar panels.

Unless otherwise indicated herein, the approaches described in this section are not prior art to the claims in this application and are not admitted to be prior art by inclusion in this section.

Building and construction codes in many countries and jurisdictions include stringent fire codes that require active and passive systems for stopping or limiting the spread of fire in buildings and other structures. Such fire codes include specific ratings for determining the capabilities of various aspects of buildings and structures for preventing, suppressing or retarding the ignition or the spread of fire. Pertinent to embodiments of the present invention, are the fire codes that are concerned with roofs and roofing systems.

To increase the safety of buildings, roof specific fire codes have been promulgated that require new and existing roofs be able to withstand certain specified tests. Such tests are designed to determine the efficacy of various roofs and roofing systems to resist or limit the spread of fire and heat in a variety of conditions. Typically, the tested rating or the determined efficacy of a particular roof or roofing system must be maintained despite the addition or augmentation of the roof or roofing system due to the installation of a secondary system.

Such secondary systems that can be installed on rooftops range from water towers and HVAC systems to photovoltaic solar panel installations. Each such secondary system can present a new set of challenges for the roof or roofing system to maintain its previously determined fire rating due to the fact that many of the secondary systems can include additional weight, penetrations, heat, debris traps and other factors and variables that were not present when the roof or roofing system was originally designed or installed. In the case of solar panels, there is increasing pressure from the roofing industry to ensure that both flush mounted and tilted roof mounted solar panel systems minimize their impact on the fire rating of roofs and roofing systems onto which they are installed.

Specifically, there is concern that the inclusion of solar panels may increase the likelihood that a fire on the roof or roofing system will spread more rapidly. Due to such concerns, various jurisdictions are responding by developing and promulgating new fire code standards specifically aimed at rooftop solar panel installations. For example, in the United States local, state, and federal government officials and agencies are cooperating with the roofing and solar panel industries and other organizations to determine changes to existing fire codes and developing new fire codes directed at rating the efficacy of rooftop solar panel installations to resist, suppress, or retard the ignition and spread of fire. Such codes include requirements for building-integrated photovoltaic (BIPV) products and rack mounted photovoltaic products for each of such products. Such codes include requirements for installation, materials, wind resistance, and fire classification. It is expected that the requirements for building integrated photovoltaic systems and rack mounted photovoltaic systems will be different.

Thus, there is a need for systems, methods, and devices for the installation of solar panels that meet the new and existing fire codes. The present invention solves these and other problems by providing retrofit and original installation devices and methods for the installation of solar panels on both flat and tilted roofs.

SUMMARY

Embodiments of the present invention improve fire resistance of roofs and roofing systems with solar panel installations. In one embodiment the present invention includes a fire blocking apparatus for a solar panel mounted on brackets to separate the solar panel from a roof surface that includes a first edge coupling joint and a first skirt structure. The first skirt structure can have a length and a width and be coupled to a first edge of the solar panel along a first edge of the fire skirt structure by the first edge coupling joint at a first angle relative to the solar panel. The width of the first skirt structure can be dimensioned to be greater than a gap between the solar panel and the roof surface. The first fire skirt structure or the first edge coupling joint is configured to alter the first angle relative to the solar panel upon application of heat or fire of a predetermined temperature from a first direction.

In such fire blocking apparatus, the first edge coupling joint can include a heat or fire sensitive material configured to melt, deform, or warp at the predetermined temperature to alter the first angle relative to the solar panel and dispose the first skirt structure to block the gap between the solar panel and the roof surface from a first side of the solar panel.

In some embodiments, the fire blocking apparatus also includes a second edge coupling joint and a second fire skirt structure, having a length and a width, coupled to a second edge of the solar panel along an edge of the second fire skirt structure by the second edge coupling joint at a second angle relative to the solar panel. The width of the second fire skirt structure is dimensioned to be greater than the gap between the solar panel and the roof surface. The second fire skirt structure or the second edge coupling joint can be configured to alter the second angle relative to the solar panel upon application of heat or fire of a predetermined temperature from a second direction. The second edge coupling joint can include a heat or fire sensitive material configured to melt, deform, or warp at the predetermined temperature to alter the second angle relative to the solar panel and dispose the second skirt structure to block the gap between the solar panel and the roof surface from a second side of the solar panel.

The fire blocking apparatus can also include a second edge coupling joint and a second fire skirt structure, having a length and a width, coupled to a second edge of the solar panel along an edge of the second fire skirt structure by the second edge coupling joint at a second angle relative to the solar panel. The width of the second fire skirt structure can be dimensioned to be greater than the gap between the solar panel and the roof surface, and the second fire skirt structure or the second edge coupling joint is configured to alter the second angle relative to the solar panel upon application of heat or fire of a predetermined temperature from a second direction.

In addition to the first and second fire skirt structures, the fire blocking apparatus can also include a third edge coupling joint and a third fire skirt structure, having a length and a width, coupled to a third edge of the solar panel along an edge of the third fire skirt structure by the third edge coupling joint at a third angle relative to the solar panel. The width of the third fire skirt structure can be dimensioned to be greater than the gap between the solar panel and the roof surface. In such embodiments, the third fire skirt structure or the third edge coupling joint is configured to alter the third angle relative to the solar panel upon application of heat or fire of a predetermined temperature from a third direction.

In yet other embodiments, the fire blocking apparatus can further include a fourth edge coupling joint and a fourth fire skirt structure, having a length and a width, coupled to a fourth edge of the solar panel along an edge of the fourth fire skirt structure by the fourth edge coupling joint at a second forth relative to the solar panel. The width of the fourth fire skirt structure can also be dimensioned to be greater than the gap between the solar panel and the roof surface. The fourth fire skirt structure or the fourth edge coupling joint could also be configured to alter the fourth angle relative to the solar panel upon application of heat or fire of a predetermined temperature from a fourth direction. In such embodiments, the solar panel concluded the first, second, third, and fourth fire skirt structures so that all sides of the solar panel are protected from heat or fire at a predetermined temperature.

In related embodiments, the fire blocking apparatus the first, second, third, or fourth fire skirt structure can include a heat or fire sensitive material configured to melt, deform, or warp at the predetermined temperature to alter the first, second, third, or fourth angle relative to the solar panel and dispose the first, second, third, or fourth fire skirt structure to block the gap between the solar panel and the roof surface from a first, second, third, or fourth side of the solar panel. In some embodiments, the first, second, third, and fourth angles relative to the solar panel are all equal, while another embodiment, the first, second, third and fourth angles relative to the solar panel can be different depending on the installation of the solar panel on the roof surface. To save materials and increase insulation, various embodiments of the fire blocking apparatus are configured such that the length of at least the first fire skirt structure is dimensioned to span the first edge of one solar panel and a first edge of another solar panel. In such embodiments, the first fire skirt structure can protect multiple solar panels from the exposure of heat or fire from the first direction.

Some embodiments include a fire blocking apparatus for a solar panel mounted on brackets to separate the solar panel from a roof surface can include a first fire skirt structure, having a length and a width. In such embodiments, the first fire skirt structure can include a plurality of louvers having vanes extending down towards the roof surface and outward away from the solar panel. The fire skirt structure can be coupled to a first edge of the solar panel along a first edge of the first fire skirt structure. In related embodiments of the present invention, the fire blocking apparatus can include a second, third and fourth fire skirt structure, each having a plurality of louvers having vanes extending down toward the roof surface and outward away from the solar panel.

Other embodiments of the present invention include a fire blocking apparatus that includes a top mounting surface, having a length and a width, that is dimensioned and configured to couple to a solar panel. In such fire blocking apparatuses, a first side surface can be coupled to a first edge of the top mounting surface along a first edge of the first side surface at an angle relative to the top mounting surface. The first side surface can also be coupled to a first edge of or configured to include a shelf surface along a second edge of the first side surface at the angle. The shelf surface can be configured to accept ballast or fasteners to fix the fire blocking apparatus and an attached solar panel to the roof surface on which it is installed.

In related embodiments, the fire blocking apparatus can also include a second, third, and fourth side surface coupled to a second, third, and fourth edge of the top mounting surface along a first edge of the second, third, and fourth side surface at the angle relative to the top mounting surface. The angle of the first, second, third, and fourth side surfaces relative to the top mounting surface can be dimensioned to configure the first, second, third, and fourth side surfaces at right angles relative to the top mounting surface. In other embodiments, the angle of the first, second, third, and fourth side surfaces relative to the top mounting surface can be dimensioned to configure the first, second, third, and fourth side surfaces outward at obtuse angles relative to the top mounting surface.

The following detailed description and accompanying drawings provide a better understanding of the nature and advantages of the present invention.

DETAILED DESCRIPTION

Described herein are techniques for making, installing, and using solar panel mounting systems and add-on devices to prevent, suppress, a retard the spread of fire in rooftop solar panel installations. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

As used herein, the term solar panel refers to any device in a planar or semi-planar form factor that captures, collects, or otherwise uses solar energy to produce electricity, heat, or other forms of energy. Typical forms of solar panels include panels of continuous or connected photovoltaic (PV) cells that convert photons to electrons, panels of tubing or ductwork through which water or air can be circulated to capture heat, and reflector cells that reflect solar energy in the form of heat to produce electricity or steam. Such solar panels can be installed on both flat and tilted roofs.

Such solar panels can be installed at the same time the roof or roofing system is installed in the building, as is typically done in new construction. In the case of photovoltaic solar panels, such integration into the building structure is often referred to as a building-integrated photovoltaic system (BIPV). Alternatively, solar panels can be installed on an existing roof or roofing system using various types of weights, ballast, racks, brackets, mounts, fasteners, and other hardware that can be incorporated into or augmented by various embodiments of the present invention. The discussion of various embodiments of the present invention herein refers to the types of solar panel installations with regard to new and existing flat and tilted roofs and roofing systems.

Figure 1:
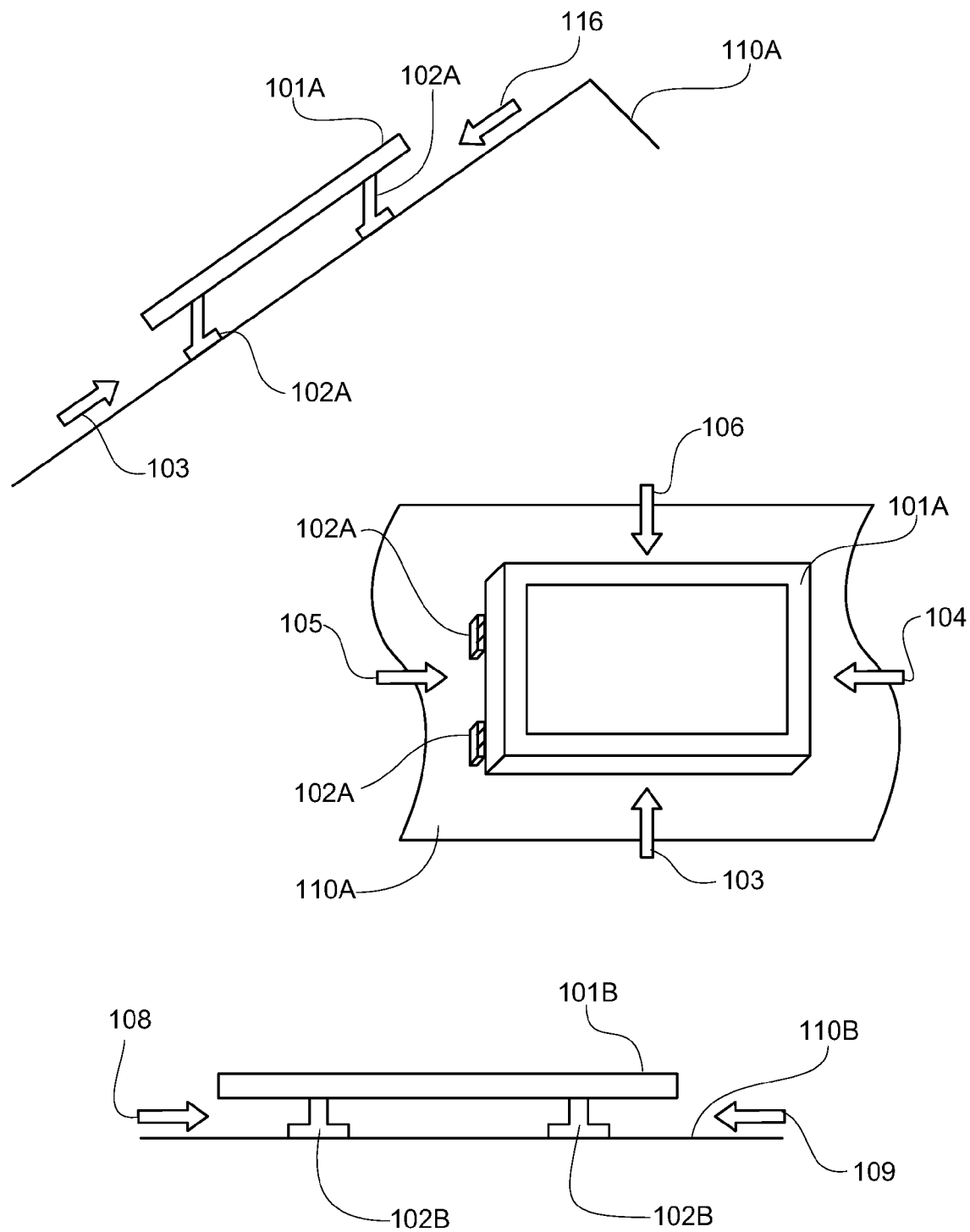
FIG. 1 illustrates conventional tilted and flat roof solar panel installations.

FIG. 1 illustrates several simplified fire code testing scenarios addressed by various embodiments of the present invention. As shown in FIG. 1, solar panels 101A can be mounted on a tilted roof surface 110A using brackets 102A. In such scenarios, the mounting brackets 102A can include individual mounting brackets separately attached to a solar panel or mounting rails to which multiple solar panels can be attached. In either scenario, the mounting brackets 102A and 102B can have L-shaped or T-shaped cross-sections. Some embodiments of the mounting rails and brackets include extruded metal or composite materials.

In either the tilted roof for the flat roof installation, some fire codes are concerned with the ability of the combination of the solar panel, the mounting brackets or mounting rails, and the roofing system to resist the ignition and spread of fire underneath the solar panel when flames of a certain temperature, velocity, and duration are directed at the side of the solar panel and into the gap between the solar panel and the roof surface along directions 103, 104, 105, 106, 108, and 109. Various embodiments the present invention are directed towards blocking or redirecting the flames from directions 103, 104, 105, 106, 108, and 109 to achieve the performance requirements of fire codes and to prevent the spread or ignition of fire on a roofing system.

Figure 2A:
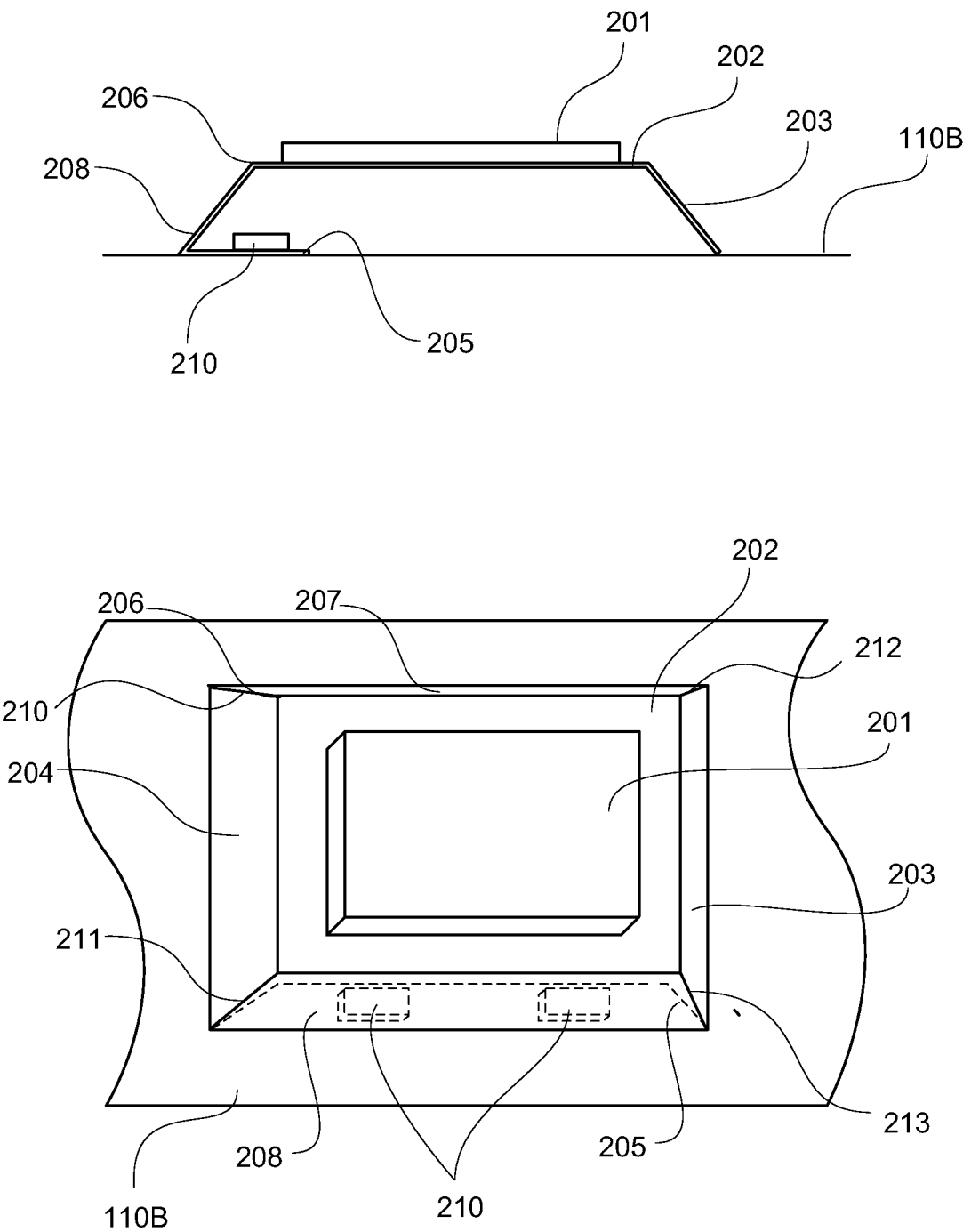
FIG. 2A illustrates a rooftop fire suppressing solar panel mounting system according to one embodiment of the present invention.

FIG. 2A shows a solar panel mounting device 206 for flat roof installations according to an embodiment of the present invention. As shown, the mounting frame 206 can include a top mounting surface 202 and sloped side surfaces 203, 204, 207, and 208. Sloped side service 208 can include a ballast shelf 205 for accepting weights or ballast 210. In such embodiments, the mounting frame device 206 can include a top mounting surface 202 to which the solar panel 201 is attached. In other embodiments the top mounting surface 202 can include a recess or an opening to accept the solar panel 201 along the bottom, perimeter, or edge of the solar panel 201 or solar panel frame.

The sloped side surfaces 203, 204, 207, and 208 can be coupled to the top mounting surface 202 by various means and at various angles. The angle at which the side surfaces 203, 205, 207, and 208 are coupled to the top mounting surface 202 can be varied to minimize wind resistance and further enhance the capability of the mounting frame 206 to resist the spread of flames. In such embodiments, the sloped side surfaces 203, 204, 207, and 208 can be angled relative to the surface of the roof onto which it is installed to redirect side directed flames away from the surface of the roof.

As shown in FIG. 2A, the side surfaces 203, 204, 207, and 208 can be configured to fully enclose the space between solar panel 201 and the roofing surface 110B. In other embodiments, in which installation of multiple solar panels is necessary or desirable, multiple mounting frame devices 206 can include variations that include different configurations having various combinations of the sloped side surfaces 203, 204, 207, and 208, that include all or some of the sides. More particularly, mounting frame device 206 can be configured to include only side surfaces 208 with ballast shelf surface 205 and a sloped side surface 207 opposing sloped side surface 208 disposed on the opposite side of solar panel 201.

Alternatively, mounting frame device 206 can be configured to include sloped side surface 208 with shelf surface 205 and one of sloped side surface 204 or sloped side surface 203. Using such configurations of mounting frame device 206, multiple solar panels 201 can be installed on a roof surface in which the mounting frame devices 206 form a tessellated mounting structure with side surfaces encapsulating the volume underneath the multiple solar panels 201.

While the side surfaces 203, 204, 207, and 208 are shown as meeting one another at the corners of the mounting frame device 206 to provide a complete seal, various embodiments of the present invention also include arrangements of the four corners at which the side surfaces meet include a gap. Such gaps may be necessary if the mounting frame device 206 is installed on a site using pre-scored, precut, or pre-creased sheet-metal or other sheet material. Specifically, gaps at edges 210, 211, 212, and 213 can also provide for ventilation of the backside of solar panels 201 during normal operation of the solar panels to increase efficiency and avoid overheating. In similar embodiments, the sheet material out of which mounting frame 206 is constructed, can include perforations or slits to provide ventilation to the solar panel 201 during normal operation of the solar panels.

In some embodiments, the ballasts 210 can be integrally formed with shelf surface 205 of mounting frame 206. In other embodiments, shelf surface 205 can include indentations or cutouts to accept ballasts of a predetermined size. In one embodiment, shelf surface 205 includes a flat continuous surface onto which ballasts, such as individual masonry units (IMUs), bricks, cinderblocks, rocks, or other relatively dense and heavy objects that can fit under the gap between the underside of the top mounting surface 202 and the top surface of the mounting shelf 205.

Figure 2B:
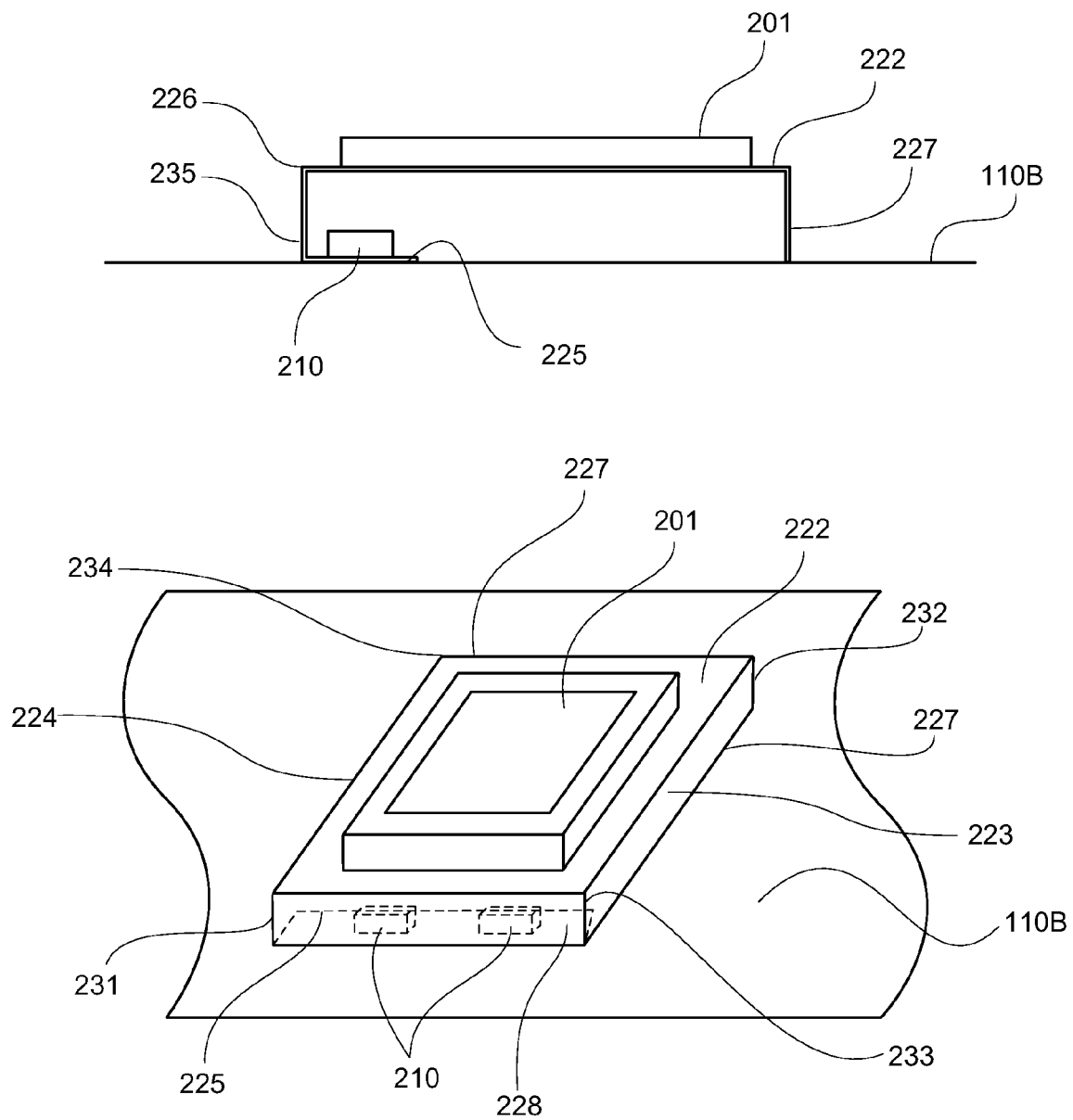
FIG. 2B illustrates a rooftop fire suppressing solar panel mounting system according to one embodiment of the present invention.

FIG. 2B includes a cross-sectional view and an isometric view of a mounting frame device 226, according to another embodiment of the present invention. In such embodiments, the mounting frame device 226 includes vertical side surfaces 223, 224, 227, and 228 that includes a shelf surface 225 disposed underneath the top surface 222. Vertical side surfaces 223, 224, 227 and 228 can be configured to be approximately at right angles relative to top surface 222 and solar panel 201. Similar to the embodiment shown in FIG. 2A, mounting frame device 226 can include gaps at edges 231, 232, 233, and 234 to provide ventilation for solar panel 201 during normal operation. Just as mounting frame 206, mounting frame 226 can include various sheet materials, such as sheet-metal or high temperature composites. Such materials of mounting frame device 226 can include notches, slots, or perforations to provide additional ventilation during normal operation of solar panel 201. The notches, slots, or perforations in the sheet material of mounting frame 226 can be configured to allow air to flow to vent heat from the undersurface of solar panel 201, but configured to restrict the spread of fire in the space between roofing surface 110B and the underside of the top surface 222 and solar panel 201.

Similar to the embodiments described above in reference to FIG. 2A, mounting frame device 226 can include variations having different combinations of vertical side surfaces and open sides. For example, mounting frame 226 can include a vertical side surface 227 and a vertical side surface 228 having a shelf surface 225, wherein shelf surface 225 is disposed underneath the top surface 222. Like shelf surface 205, shelf surface 225 can be configured to accept weights or ballasts to secure the solar panel 201 and mounting frame 226 to flat roof surface 110B. In other embodiments, vertical side surface 228 having shelf surface 225 can be coupled to the top surface 222 along with vertical side surface 223 or 224. Such embodiments are useful for mounting solar panels 201 in rooftop installations having a plurality of solar panels. Various variations of mounting frame 226 can be used to create a composite tessellated mounting frame having vertical side surfaces surrounding the volume defined by the multiple top surfaces 222 and the rooftop surface 110B.

The side surfaces 203, 204, 207, and 208 of FIG. 2A and vertical side surfaces 223, 224, 227, and 228, can be arranged relative to other mounting frames and other structures present on the rooftop on which the installation is located to resist the spread of fire in the volume underneath the top surfaces 202 or 222 and the rooftop surface 110B. In some embodiments, this can mean that the sloped side surfaces and the vertical side surfaces have different lengths and bottom edge profiles that are customized on-site or at the factory to accommodate various features on otherwise flat roofs or roofing systems. For example, vertical side surfaces 223 and 224 can be shorter than vertical side surfaces 227 and 228 to allow cables to be laid underneath mounting frame 226 and solar panel 201. Similarly vertical side surfaces 223 and 224 can include notches or holes for the pass through of cables from one solar panel to another and finally down to an uplink/downlink electrical connection coupled to an inverter or other power conditioning or converting device or system.

Figure 3:
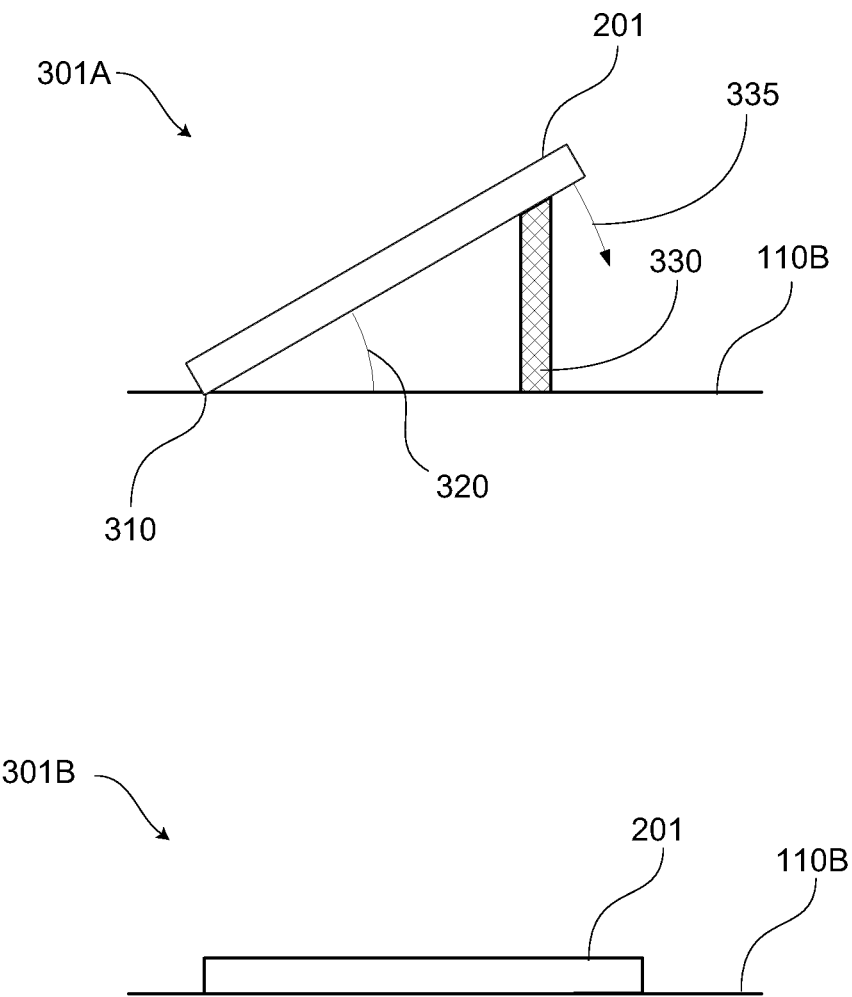
FIG. 3 illustrates a collapsing rooftop fire suppressing solar panel mounting system according to one embodiment of the present invention.

FIG. 3 shows yet another embodiment of the present invention for mounting solar panels 201 onto a flat roof or roofing system surface 110B. In such embodiments, solar panel 201 can be installed on the roof or roofing system surface 110B as shown in configuration 301A. In configuration 301A solar panel 201 rests on the roof or roofing system surface 110B at point 310 and is propped up by a fire or heat sensitive leg 330 such that the solar panel 201 is at an angle 320 relative to the surface 110B. Installation configuration 301A shows fire heat sensitive leg 330 in place supporting solar panel 201 at various points or along the line on one side of the bottom side of solar panel 201. The configuration of the fire or heat sensitive leg 330 can vary based on the requirements for configuration of the roof or roofing system surface 110B. For example, fire heat sensitive leg 330 can be in the form of a bar, a plank, individual shafts, rods, cones, pyramids, or any other shape suitable to stably holding solar panel 201 at angle 320 during normal operation.

Upon exposure to sufficient heat, fire, or flames, the material included in fire heat sensitive leg 330 can be configured to melt, deform, collapse, or otherwise fail such that the solar panel 201 will fall along direction 335 to be flush or approximately flush with the roof or roofing system surface 110B as shown in collapsed configuration 301B. The temperature at which the fire or heat sensitive leg 330 allows solar panel 201 to become flush or approximately flush with the roof or roofing system surface 110B can be determined by the material used to construct the heat or fire sensitive leg 330. In some embodiments, it is advantageous for the material selected for the heat or fire sensitive leg 332 to remain structurally sound at normal operating temperatures typically encountered on a roof installation of solar panels.

When solar panel 210 is flush with the roof or roofing system surface 110B, the application of fire from any angle parallel to the surface 110B will be inhibited, thus preventing or suppressing the spread of fire between roof or roofing surf system surface 110B and the solar panel 201.

Figure 4:
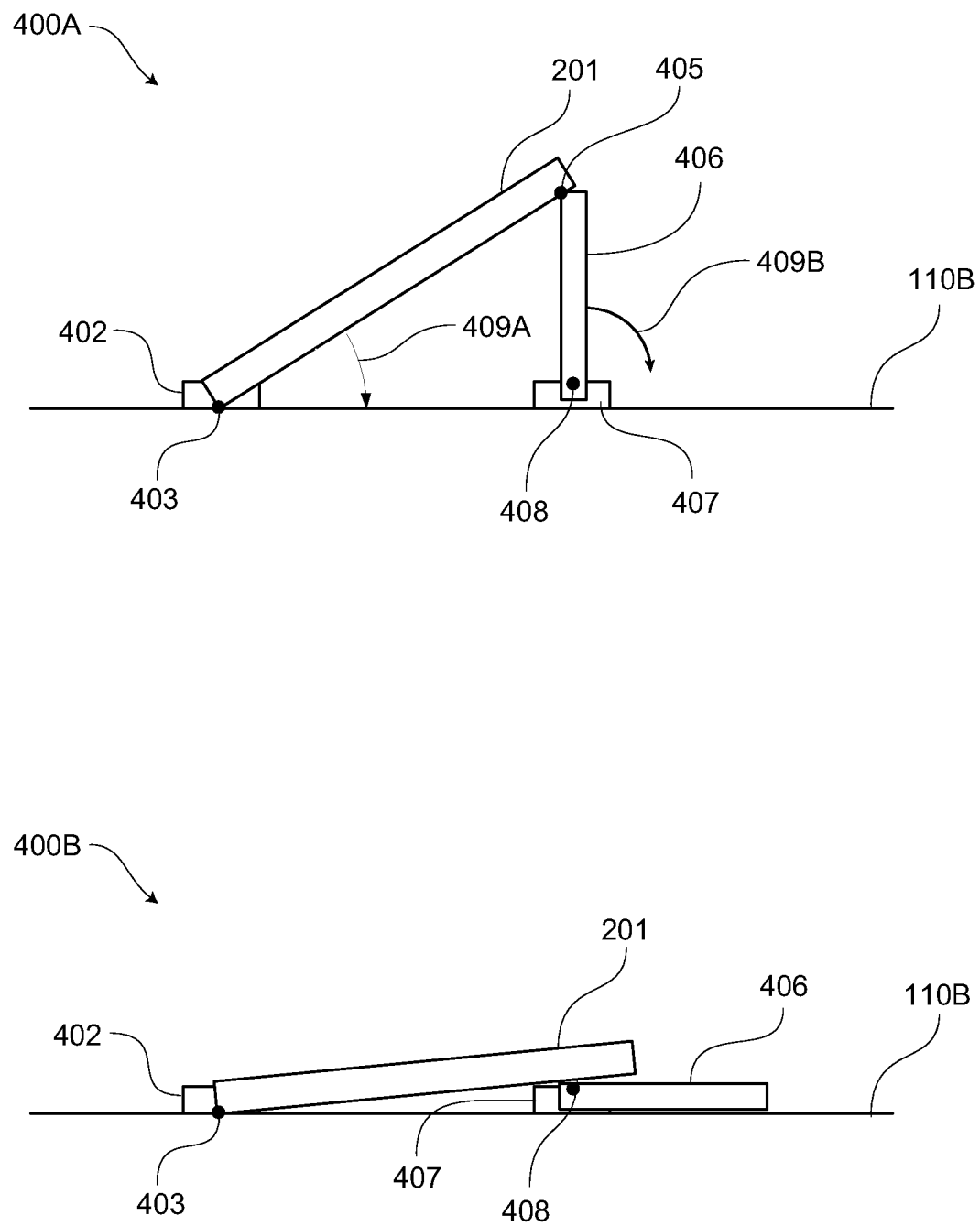
FIG. 4 illustrates another collapsing rooftop fire suppressing solar panel mounting system according to one embodiment of the present invention.

FIG. 4 shows another embodiment of the present invention which is a variation on the embodiment described above in reference to FIG. 3. As shown the solar panel 201 can be installed on the roof or roofing system surface 110B using a mounting bracket 402 at one end of the solar panel 210 that can pivot about a point 403. Point 403 can include a hinge, a Cotter pin, a hinge pin, a screw, bolt, or any other elements capable of providing a pivot point. Once solar panel 201 is coupled to the mounting bracket 402 at the point 403, it can be lifted to create an angle with roof or roofing system surface 110B using a support structure or leg 406 attached to the solar panel on the other end or edge attachment point 405 and coupled to the roof or roofing system surface 110B via a mounting bracket 407 via a pivot point 408, as shown in configuration 400A. Support structure 406 can be coupled to the solar panel 201 via a heat or fire sensitive coupling element 405.

In some embodiments the heat or fire sensitive coupling element 405 can include a heat or fire sensitive adhesive or fastener that will melt, deform, collapse, or otherwise fail such that the solar panel 201 can fall to be flush or approximately flush with the roof or roofing system surface 110B, as shown in collapsed configuration 400B. The heat or fire sensitive coupling element 405 can include a number of materials including, but not limited to, metal alloys, composites, polymers, plastics, and ceramics. When exposed to excessive heat or fire temperatures, heat or fire sensitive coupling element 405 will release, thus allowing support structure to fall or rotate in the direction of arrow 409B about pivot point 408. As support structure 406 rotates along the direction of arrow 409B about to the point 408, solar panel 201 will move in the direction of arrow 409A about to the point 403 until it is in the collapsed configuration 400B. In such embodiments, solar panel 201 can include a side vane or guard to block the gap between the roof or roofing system surface 110B and solar panel 201 due to the solar panel 201 resting on one or more mounting brackets 407.

Figure 5:
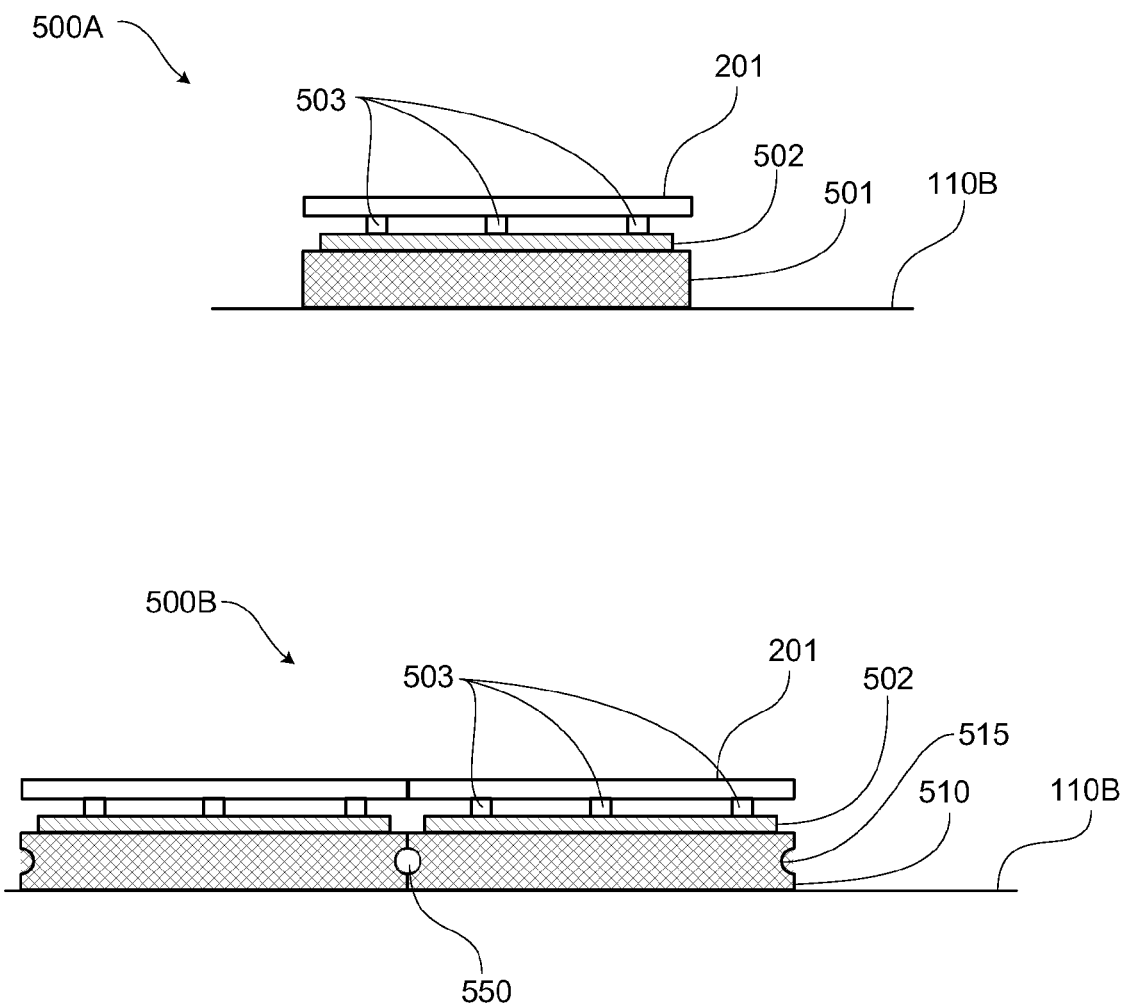
FIG. 5 illustrates a rooftop fire suppressing solar panel mounting system with integrated ballast according to one embodiment of the present invention.

FIG. 5 shows another embodiment of the present invention for installation of solar panels 201 on flat or semi-flat roofs or roofing systems. As shown, configuration 500A can include a solar panel 201 coupled to a number of standoffs 503 which are resting on or coupled to a mounting frame 502. The mounting frame 502 can be coupled to a ballast structure 501. The ballast structure 501 can include a number of materials of sufficient density and weight to affix the solar panel 201 to the roof or roofing system surface 110B without the use of fasteners or penetrations into the roofing surface 110B. In such embodiments, ballast structure 501 can include cementitious material, concrete foam, cinderblocks, or other fire resistance dense or heavy materials. In some embodiments, the height of standoffs 503 can be configured to provide sufficient ventilation under solar panel 201 during normal operation.

FIG. 5 also shows a variation of configuration 500A in configuration 500B that includes channel cuts or grooves 515 that can create wiring or cable conduits 550 when the configuration 500B unit is placed in-line with another configuration 500B unit. Such installations beneficially protect the wiring or cabling between solar panels 201, inverters, and other electrical components of other flat roof solar panel installations shown in FIG. 5.

Figure 6:
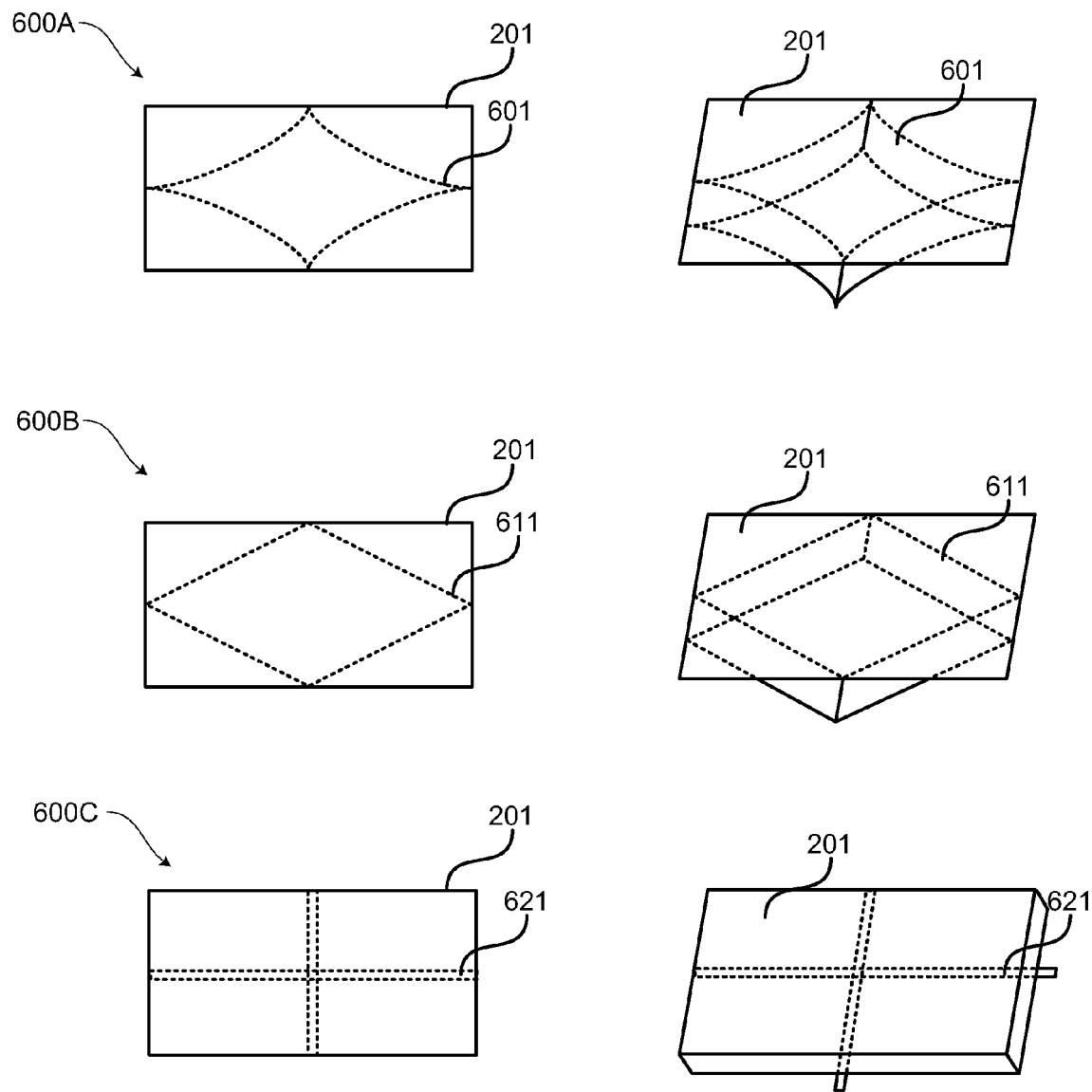
FIG. 6 illustrates fire suppressing solar panel mounting brackets for use on flat roofs according to one embodiment of the present invention.

FIG. 6 shows a number of structural support mounts the can be used in flat roof or roofing system installations of solar panels 201 to prevent the spread of fire underneath the solar panel 201 according to various embodiments of the present invention. Each of the variations of the structural support mounts shown in FIG. 5 include a multi-walled structure onto which a solar panel 201 can be placed. The multi-walled structure can include a number of vertical wall elements coupled to one another in various configurations. The shape and configuration of the vertical wall elements can be customized based on the ventilation or cooling requirements of a particular solar panel 201 as well as any local, state, or federal fire codes.

For example, configuration 600 a can include a solar panel 201 resting on or coupled to a structural support mounts 601, 611, or 621. Structural support mounts 601, 611, and 621 can include a number of vertical wall sections having identical or varied curves to provide structure and stability to one another when placed on a roof or roofing system surface on the bottom edges of the walls. The solar panel 201 can then rest on or be coupled to the top edges of the walls of the structural support mounts 601, 611, and 621. The shape of the vertical wall sections of the structural support mounts 601, 611, and 621 can include hyperbolic, parabolic, circular and other curved profiles as illustrated in configurations 600A, 600B, and 600C. In such exemplary embodiments, the shape and height of the vertical wall sections can be optimized for number of factors or requirements such as fire suppression, wind resistance, solar panel cooling, and other operational factors. For example, structural support mounts 601 can provide enhanced solar panel ventilation or cooling based on the amount of solar panel overhang beyond the interior of the vertical wall sections.

In related embodiments, a plurality of structural support mounts 601, coupled to solar panels 201 can be installed next to one another in a tiled fashion such that the structural support mounts 601, 611 or 621 coupled to a first solar panel 201 will match up with and abut the structural support elements 601, 611, or 621 of a second solar panel placed next to the first solar panel 201. In such embodiments, it may be desirable to use a single type of structural support mounts for a particular solar panel installation to maximize the efficiency and fire suppression characteristics, such as the inclusion of the least number of gaps between the solar panels and structural support mounts. Some shapes of structural support mounts can advantageously redirect or reverse the flow of fire or flames directed into the gap between a number of solar panels and the roof or roofing system surface onto which they are placed using the structural support mounts.

For example, structural support mounts 601 when placed next to another support structure mount 601 will create a rounded or U-shaped block that can redirect the flow of fire that is directed underneath the solar panels away from the space underneath the solar panel and above the roof surface.

Figure 7:
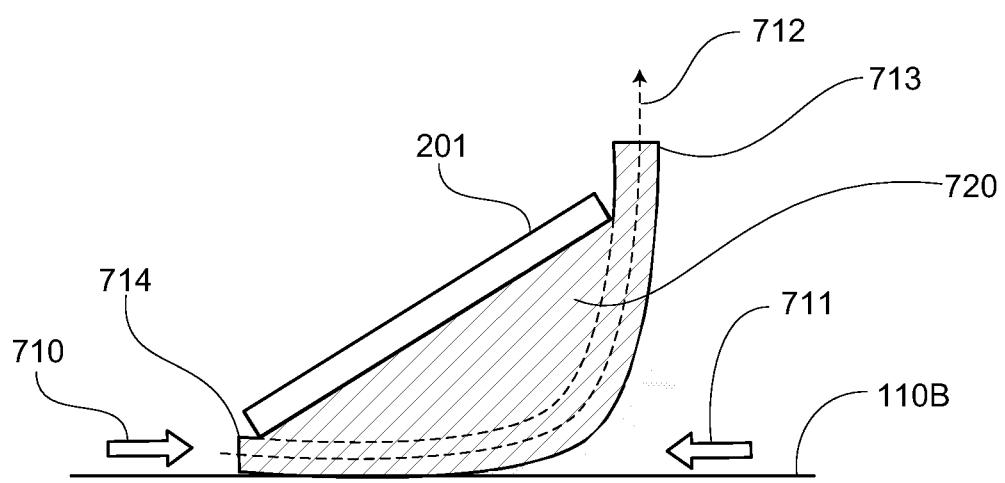
FIG. 7 illustrates a fire suppressing solar panel mounting bracket for use on flat roofs according to one embodiment of the present invention.

FIG. 7 shows yet another embodiment of a flat roof solar panel mount assembly according to an embodiment of the present invention that can redirect flames to help prevent or suppress the spread of fire on a roof under solar panel 201. As shown, solar panel mount 713 can include a structure having a first, or bottom, wall and a second, or top, wall separated by some distance to create a duct or channel between the first and second walls. The channel can be curved, as shown, to have a rounded bend such that the internal channel transitions from a horizontal channel to a vertical channel along path 712. Due to the curve in the top wall of the solar panel mount 713, solar panel 201 can be placed or mounted at an angle, as shown. The space in between the top wall of the solar panel mount 713 can be enclosed by a wall or skirt structure 720 to prevent fire from entering the gap between the solar panel mount 713 and solar panel 201.

In some embodiments, the solar panel mount 713 can include fire proof materials such as metal or a cementitious material comprising fire proof or retardant properties. In such embodiments, when flames are directed at the solar panel 201 and solar panel mount 713 combination along the direction 710 parallel with the roof surface 110B, the flames can be redirected through the inner channel of the solar panel mount 713 along direction 712 up and away from the surface of the roof 110B to help avoid the spread of fire on the roof or under solar panel 201. When flames are directed at the solar panel 200 and solar panel mount 713 along direction 711 parallel with the roof surface 110B, the flames are stopped from reaching the space underneath the solar panel mount 713 by the bottom wall.

When flames are directed in a direction into the page parallel to the roof surface 110B, the flames are stopped by the wall 720. When multiple solar panels are installed on a roof in a row, the solar panel mount 713 can be dimensioned such that it can support multiple solar panels in a line. Alternatively, each solar panel mount 713 can be dimensioned to support a single solar panel 201 and configured to abut and or a couple to a neighboring solar panel mount 713 to create a line of solar panels 201 and solar panel mounts 713 assemblies. In such embodiments, only the end solar panel 201 and solar panel mount 713 assemblies need include an end wall 720 to prevent flames or fire from entering the gap between the solar panel mount 713 and the solar panels 201.

Figure 8:
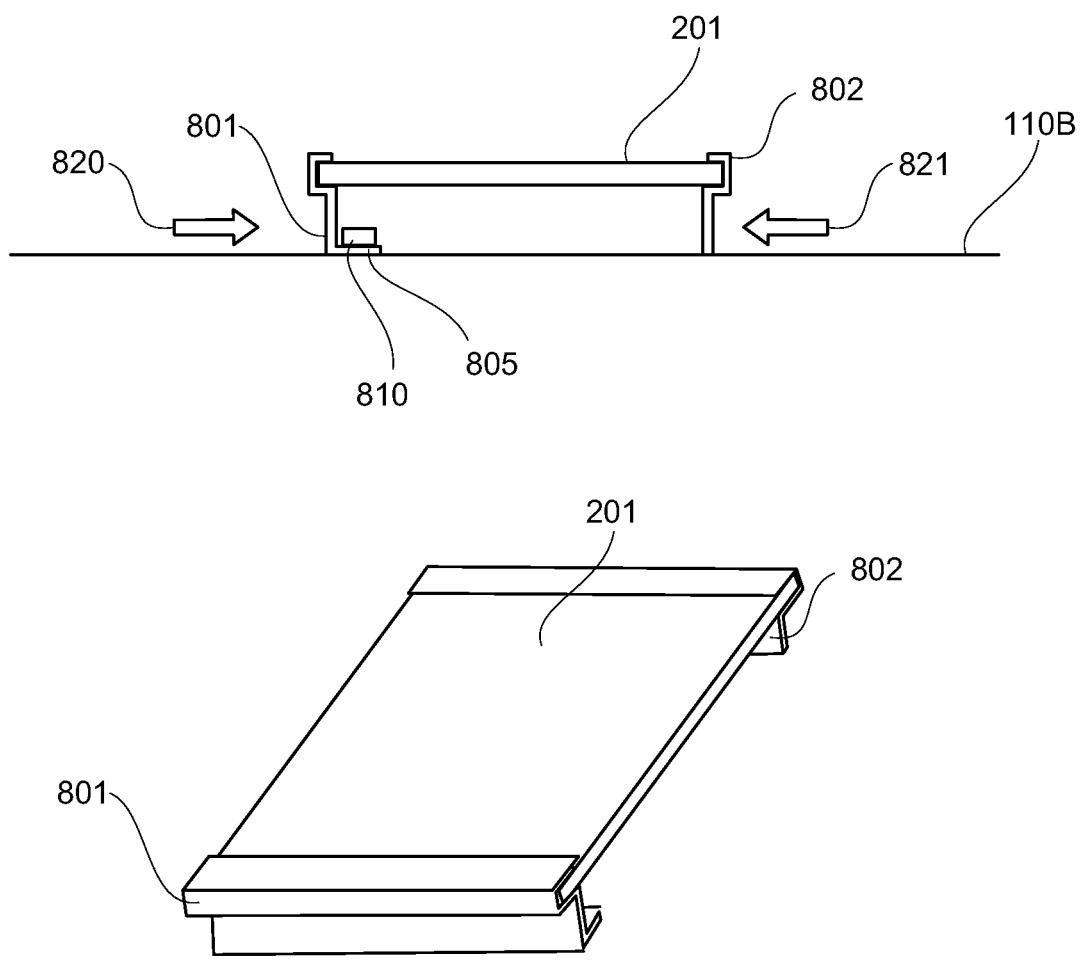
FIG. 8 illustrates a fire blocking solar panel mounting bracket for use on flat roofs according to one embodiment of the present invention.

FIG. 8 shows yet another embodiment of the present invention that can be used to install solar panels 201 on both flat and tilted roof surfaces. As shown, solar panel 201 is installed on roof surface 110B by mounting brackets 801 and 802. Solar panel 201 can be positioned in a horizontal or tilted configuration by varying the lengths of the leg elements of brackets 801 and 802. Each of mounting brackets 801 and 802 can include extruded metal rails having wall sections that extend from the bottom surface of the solar panel 201 to the roof surface 110B to block flames are directed along the directions 820 and 821 parallel with the roof surface 110B, thus preventing or suppressing the spread of fire in the space underneath the solar panel 201 in the surface of the roof.

In related embodiments, mounting bracket 801 can include the lip or shelf element 805 for accepting a fastener or ballast 810. In flat roof installations, as shown, the top surface of shelf element 805 can include indentations or holes for accepting specifically designed or general purpose ballast blocks. In tilted roof solutions, the shelf element 805 can include pass-through holes for accepting fasteners, such as screws, bolts or rivets, to couple mounting bracket 801 to the roof surface 110B. Mounting bracket 802 can include a leg element having a bottom edge that rests on the roof surface 110B.

In related embodiments, each of mounting brackets 801 and 802 can be dimensioned to accept multiple solar panels 102. In such embodiments, each mounting bracket 801 can include rails that accept an edge of solar panels 201 in a clamp section. As shown, the clamp section can comprise a C-shaped or U-shaped region into which the edge of solar panel 201 can be seated or clipped.

Figure 9:
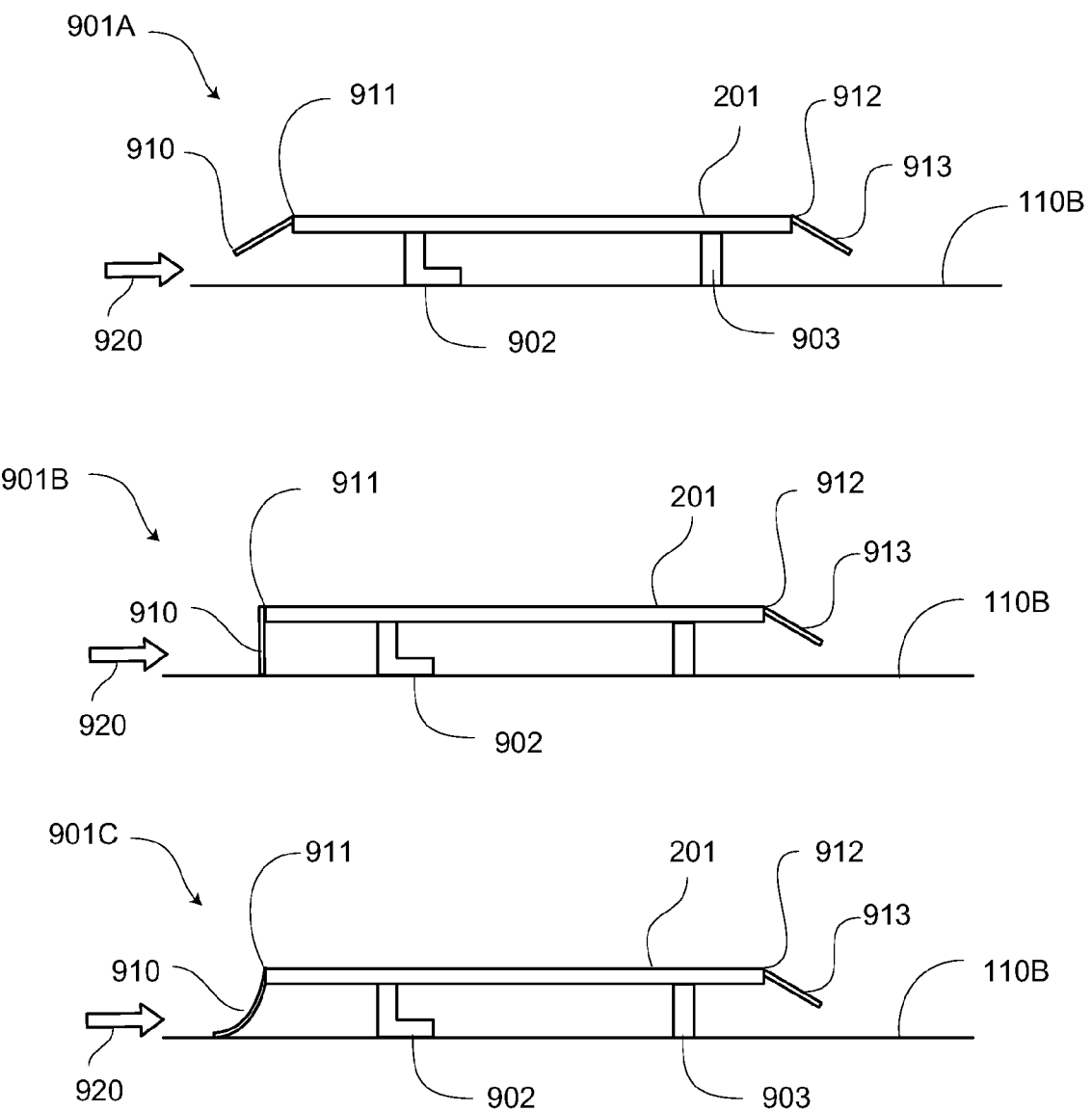
FIG. 9 illustrates a fire blocking solar panel assembly with collapsible side skirts according to one embodiment of the present invention.

FIG. 9 shows yet another embodiment of the present invention. In such embodiments, a solar panel 201 is mounted to a roof surface 110B on mounting brackets 902 and 903 in the normal operating configuration 901A. Fire block elements 910 and 913 can be affixed around the perimeter of solar panel 201. While fire block elements 910 and 913 are shown coupled to solar panel 210 at joints 911 and 912 at a downward angle toward the surface 110B, various embodiments can include coupling the fire block elements 910 and 913 in other angles, including parallel to the solar panel 901. During normal operation the solar panel 201 installed in configuration 901A, all of the elements remain stationary or static and the fire block elements 910 and 913 relative to the roof surface 110B to provide ventilation and cooling for the solar panel 201. Upon application of heat or flames in the direction of arrow 920 directed at the gap under the fire block elements 910 and solar panel 201 and above roof surface 110B, fire block element 910 can collapse into either configuration 901B or 901C.

Configuration 901B illustrates the embodiment in which fire block element 910 is coupled to solar panel 201 using a heat or fire sensitive joint 911. At a certain temperature, joint 911 can be configured to collapse down to block fire, heat or flames coming from the direction 920 from entering the space underneath solar panel net 201 and above roof surface 110B, thus preventing or suppressing the spread of fire under the solar panel 201.

Figure 10:
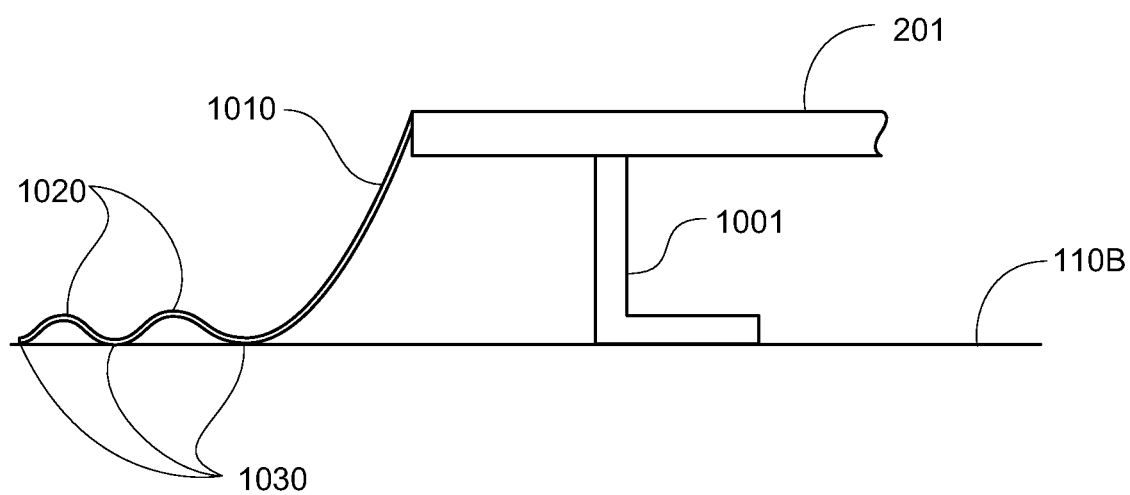
FIG. 10 illustrates a fire blocking solar panel fire skirt according to one embodiment of the present invention.

Configuration 901C illustrates another embodiment in which fire block element 910 includes a material that will melt, deform, bend or otherwise fail to conform to the gap between the solar panel 201 and the roof surface 110B, as shown. FIG. 10 shows a close-up of a variation of the configuration 901C.

Solar panel 201 can be coupled to the roof surface 110B by a mounting bracket 1001 using fasteners or a ballast. In such embodiments, the fire blocking elements 1010 can be configured to deform or drop into position upon exposure to heat or flames of a certain temperature such that the portion of the fire blocking elements 1010 includes ripples or waves 1020 that have multiple points of contact 1030 with surface 110B. In such embodiments, the fire blocking element 1010 can include a material that can provide tension between the multiple contact points 1030 and the roof surface 110B. Such materials include, but are not limited to stainless steel, metal alloys, and composite plastics and polymers with spring characteristics. Advantages of having multiple contact points 1030 between fire blocking element 1010 and the roof surface 110B include the ability to effectively block heat, fire or flames from reaching the underside of solar panel 201.

Figure 11:
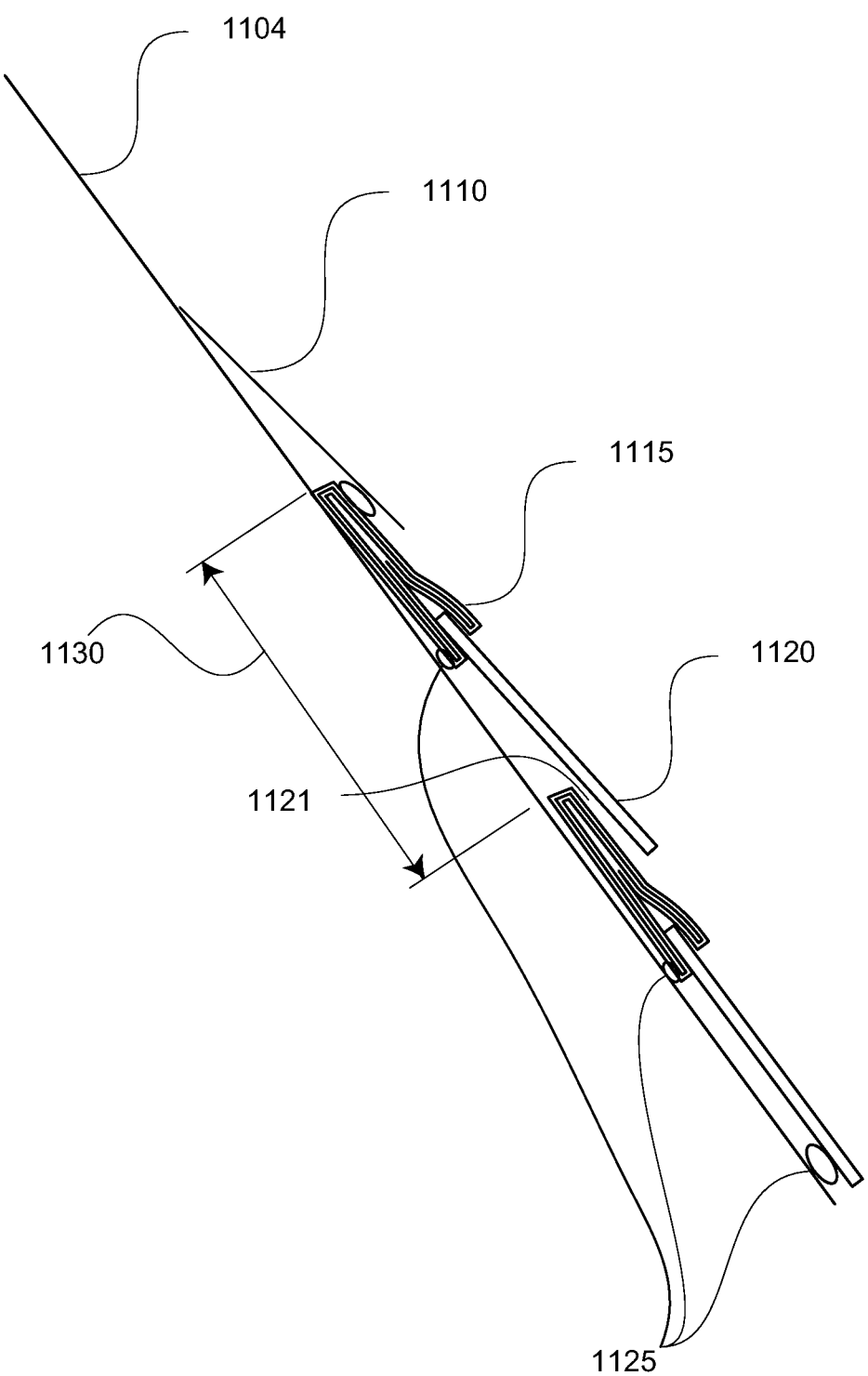
FIG. 11 illustrates a fire blocking solar panel building-integrated photovoltaic mounting system according to one embodiment of the present invention.

FIG. 11 shows a building integrated photovoltaic installation on a slanted roof 1104, according to various embodiments of the present invention. Such embodiments are advantageous when installed in a new construction or during the construction of a new roofing system. The roofing system shown in FIG. 11 is a shingle or composite roofing system that can include an underlying or sub roof surface 1104. The underlying or sub roof surface 1104 can be made of a number of materials that provide support, structure and possibly another layer of water proof membrane onto which the other components of the roofing system 1100 can be affixed. As shown, the roofing system that includes the building integrated photovoltaic cells 1120 as part of the shingled or overlapping elements also includes mounting brackets 1115 that can be fastened, adhered, or otherwise affixed to the underlying or sub roof surface 1104. The installation of such building integrated photovoltaic systems can begin with coupling an array of mounting brackets 1115 to the underlying or sub roof surface 1104. Such an array of mounting brackets can include multiple rows disposed over the underlying or sub roof surface 1104 with separations 1130 between the rows that are then fitted with overlapping rows of framed or frameless photovoltaic cells 1115. As in the shingle configuration shown in FIG. 11, the overlapping elements 1115 and 1120 can include standard glass module laminate solar cells with and without frames.

Once the array of mounting brackets are disposed on the roof surface, installers can begin placing photovoltaic cells 1115 into the clamp section of the mounting brackets. In some embodiments, the clamp sections of the mounting brackets 1115 include a click-lock system that provides for the insertion of one edge of the photovoltaic cell 1120. The interface with the click-lock system of the mounting bracket 1115 can be configured to engage the photovoltaic cell 1020 with a positive and secure physical coupling. In related embodiments, mounting bracket 1115 can also be configured to include wiring and wire contacts to electrically couple to contacts on the specialized photovoltaic cell 1120 to provide both physical coupling and electrical coupling when the photovoltaic cell 1120 is inserted into the clamp section of mounting bracket 1115. In other embodiments, photovoltaic cells 1120 can be further secured by inserting or applying adhesive between the backside of the photovoltaic cell and a mounting located in a lower row of mounting brackets.

As shown, the top row of mounting brackets and photovoltaic cells can be using metal flashing, or some other suitable material for flashing, 1110. The flashing 1110 can be coupled to the underlying or sub roof surface 1104 at the top using traditional fastening methods and secured to the top row of mounting brackets using the adhesive under the portion of the flashing that overlaps the top of the top row of mounting brackets. All rows, including the bottom row, of photovoltaics can be stabilized and protected from mechanical stress by inserting spacers and/or adhesive in locations 1125.

Figure 12:
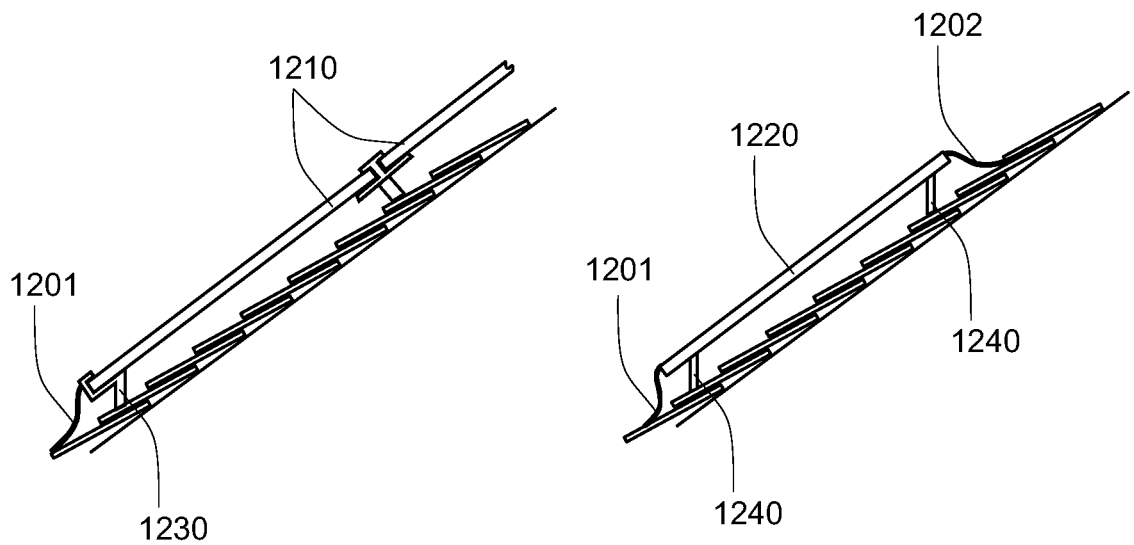
FIG. 12 illustrates a fire blocking solar panel mounting system for use on tilted roofs mounting system according to one embodiment of the present invention.
Figure 12:
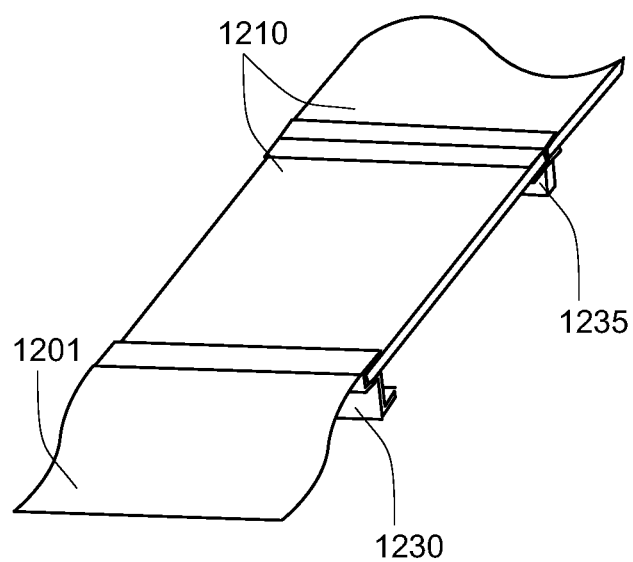

FIG. 12 illustrates yet another embodiment the present invention for the installation of solar panels on existing tilted shingled roofing system. As shown, solar panels 1210 can be installed on the roof system using a variety of mounting brackets. Such mounting brackets can include all of the roof type mounting brackets 1230 and middle of the roof mounting brackets 1235. In such installations, solar panels 1210 can be installed in one-dimensional or two-dimensional array of solar panels disposed along a longitudinal direction of the roof. Such installations can include a downslope fire blocking element 1201 similar to fire blocking elements described above. The fire blocking element 1201 can include upper materials that can be configured to lower or deform into place such that the fire blocking element 1201 is disposed to block heat, fire, or flames from entering the gap between the solar panels 1210 and the roofing surface.

In similar embodiments, in which the solar panel installation includes only a single solar panel or a one-dimensional array of solar panels disposed in a latitudinal direction on the roof surface, fire blocking elements 1201 can be installed on the lower edge of the solar panel 1220 and fire blocking element 1202 can be disposed or affixed to the top edge of the solar panel 1220. In such configurations, when exposed to temperatures exceeding a certain temperature, one or both of the fire blocking elements 1201 and 1202 can be repositioned or deform into position so as to prevent or suppress the spread of heat, fire, or flames from reaching the gap between solar panel 1220 in the surface of the roof.

Figure 13:
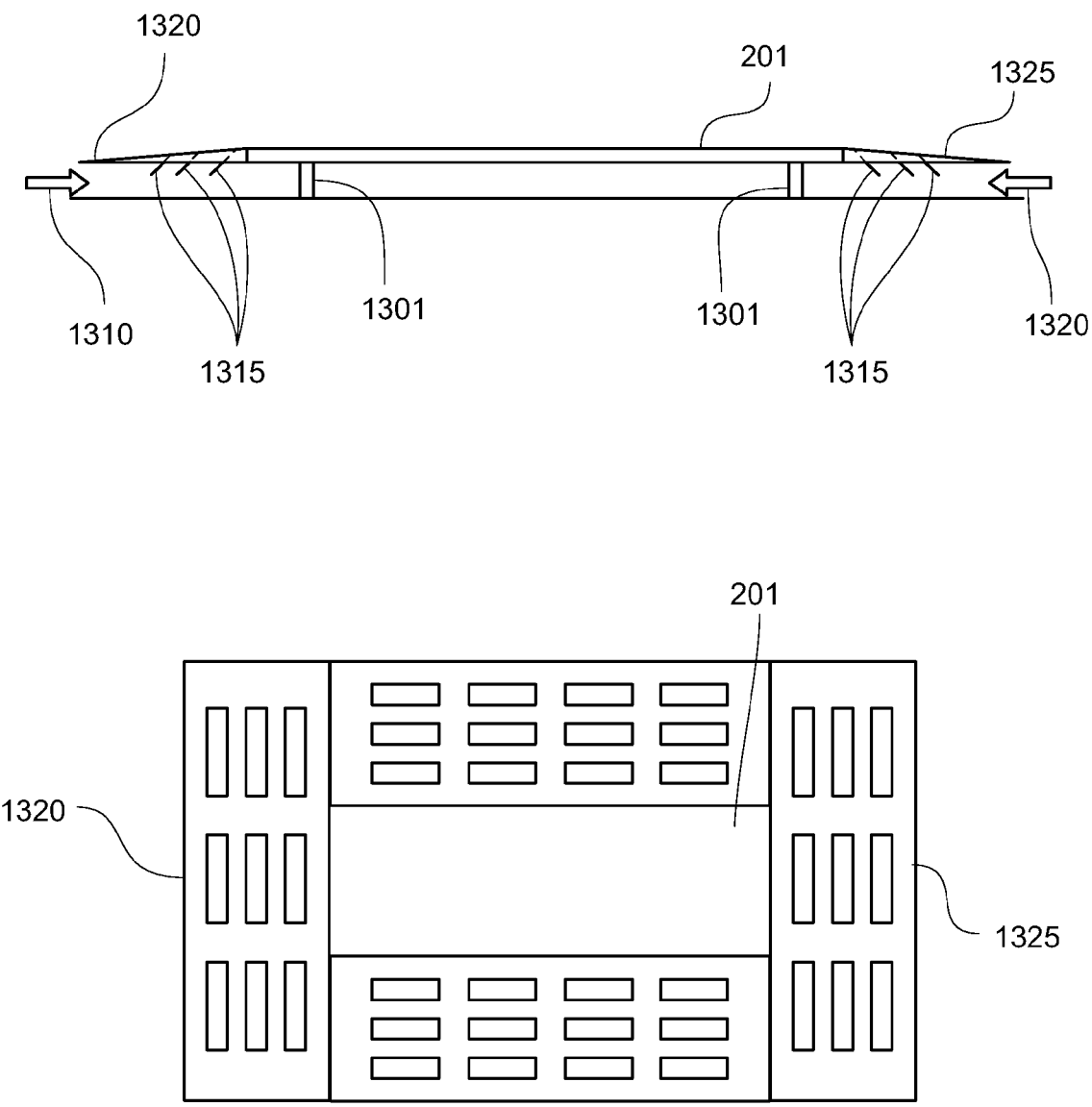
FIG. 13 illustrates a solar panel fire skirt assembly with diverting louvers according to one embodiment of the present invention.

FIG. 13 shows yet another embodiment of the present invention that can be using installation of solar panels 201 on a flat or tilted roof to prevent spread of heat, fire, or flames from entering the gap between the roof surface and the underside of the solar panel 201. As shown, solar panel 201 can be mounted to the roof surface via mounting brackets 1301. Side skirts 1320, 1325, 1330, and 1335 can be affixed to the outer edges of the solar panel 200. Each of the side skirts can include a number of louvers 1315 that extend downward toward the surface of the roof and outward from the center of the solar panel 201. The length in the direction of the louvers 1315 can vary depending on the height of mounting brackets 1301 and the requirements of any applicable fire codes.

As depicted in the side view of the configuration 1300, heat, fire, or flames can be directed along the direction of 1310 or 1320. In such embodiments, at least some portion of heat, fire, or flames directed under the configuration 1300 including side skirts 1320, solar panel 201, and side skirts 1325 will be redirected toward the top surface of the fire skirts thus reducing the amount of heat, fire, or flames that reach the region between the underside of solar panel 201 and the roof surface. The portion of the heat, fire, or flames that reaches the region between the underside of solar panel 201 and the roofing surface can be determined by the dimensions of the louvers 1315. The longer and wider the louvers 1315 are dimensioned, the lower the portion of the heat, fire, or flames directed along directions 1310 and 1320 between the underside of solar panel 201 and the roof surface. The reduction of the heat, fire or flames reaches the region between the underside of solar panel 201 and the roof surface will help prevent or suppress the spread of fire or flames under the solar panel 201.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A fire blocking apparatus for a solar panel mounted on brackets that separate the solar panel from a roof surface comprising: a first edge coupling joint; and a first structure, having a length and a width, coupled to a first edge of the solar panel along a first edge of the first structure by the first edge coupling joint at a first angle relative to the solar panel; wherein the width of the first structure is dimensioned to be greater than a gap between the solar panel and the roof surface;

and wherein the first structure or the first edge coupling joint is configured to alter a first angle relative to the solar panel upon application of heat or fire of a predetermined temperature from a first direction, the first angle being defined by the solar panel and the roof surface;

wherein the first edge coupling joint comprises a heat or fire sensitive material configured to melt, deform, or warp at the predetermined temperature to alter the first angle relative to the solar panel and dispose the first structure to block the gap between the solar panel and the roof surface from a first side of the solar panel.

2. The fire blocking apparatus of claim 1 further comprising: a second edge coupling joint; and a second structure, having a length and a width, coupled to a second edge of the solar panel along an edge of the second structure by the second edge coupling joint at a second angle relative to the solar panel; wherein the width of the second structure is dimensioned to be greater than the gap between the solar panel and the roof surface; wherein the second structure or the second edge coupling joint is configured to alter the second angle relative to the solar panel upon application of heat or fire of a predetermined temperature from a second direction; and wherein the second edge coupling joint comprises a heat or fire sensitive material configured to melt, deform, or warp at the predetermined temperature to alter the second angle relative to the solar panel and dispose the second structure to block the gap between the solar panel and the roof surface from a second side of the solar panel.

3. The fire blocking apparatus of claim 1 further comprising: a second edge coupling joint; and a second structure, having a length and a width, coupled to a second edge of the solar panel along an edge of the second structure by the second edge coupling joint at a second angle relative to the solar panel; wherein the width of the second structure is dimensioned to be greater than the gap between the solar panel and the roof surface; and wherein the second structure or the second edge coupling joint is configured to alter the second angle relative to the solar panel upon application of heat or fire of a predetermined temperature from a second direction.

4. The fire blocking apparatus of claim 3 further comprising: a third edge coupling joint; and a third structure, having a length and a width, coupled to a third edge of the solar panel along an edge of the third structure by the third edge coupling joint at a third angle relative to the solar panel; wherein the width of the third structure is dimensioned to be greater than the gap between the solar panel and the roof surface; and wherein the third structure or the third edge coupling joint is configured to alter the third angle relative to the solar panel upon application of heat or fire of a predetermined temperature from a third direction.

5. The fire blocking apparatus of claim 4 further comprising: a fourth edge coupling joint; and a fourth structure, having a length and a width, coupled to a fourth edge of the solar panel along and edge of the fourth structure by the fourth edge coupling joint at a second forth relative to the solar panel; wherein the width of the fourth structure is dimensioned to be greater than the gap between the solar panel and the roof surface; and wherein the fourth structure or the fourth edge coupling joint is configured to alter the fourth angle relative to the solar panel upon application of heat or fire of a predetermined temperature from a fourth direction.

6. The fire blocking apparatus of claim 5 further wherein the first, second, third, or fourth structure comprises a heat or fire sensitive material configured to melt, deform, or warp at the predetermined temperature to alter the first, second, third, or fourth angle relative to the solar panel and dispose the first, second, third, or fourth structure to block the gap between the solar panel and the roof surface from a first, second, third, or fourth side of the solar panel.

7. The fire blocking apparatus of claim 6 wherein the first, second, third, and fourth angles relative to the solar panel are all equal.

8. The fire blocking apparatus of claim 1 wherein the length of the first structure is dimensioned to span the first edge of the solar panel and a first edge of another solar panel.

9. A fire blocking apparatus for a solar panel mounted on brackets to separate the solar panel from a roof surface comprising: a first structure, having a length and a width, comprising a plurality of louvers having vanes extending down towards the roof surface and outward away from the solar panel, wherein the first structure is coupled to a first edge of the solar panel along a first edge of the first structure.

10. The fire blocking apparatus of claim 9 further comprising: a second structure, having a length and a width, comprising a plurality of louvers having vanes extending down towards the roof surface and outward away from the solar panel, wherein the second structure is coupled to a second edge of the solar panel and a second edge of the first structure along a first edge of the second structure.

11. The fire blocking apparatus of claim 10 further comprising: a third structure, having a length and a width, comprising a plurality of louvers having vanes extending down towards the roof surface and outward away from the solar panel, wherein the third structure is coupled to a third edge of the solar panel and a second edge of the second structure along a first edge of the third structure.

12. The fire blocking apparatus of claim 10 further comprising: a fourth structure, having a length and a width, comprising a plurality of louvers having vanes extending down towards the roof surface and outward away from the solar panel, wherein the fourth structure is coupled to a fourth edge of the solar panel, the first edge of the third structure, and the first edge of the first structure along a first edge of the fourth structure.

13. A fire blocking apparatus comprising:
a top mounting surface, having a length and a width, dimensioned and configured to couple to a solar panel; and
a first side surface coupled to a first edge of the top mounting surface along a first edge of the first side surface at an angle relative to the top mounting surface;
wherein the first side surface comprises a shelf surface portion extending away from a bent region of the first side surface.

14. The fire blocking apparatus of claim 13 further comprising a second side surface coupled to a second edge of the top mounting surface along a first edge of the second side surface at the angle relative to the top mounting surface.

15. The fire blocking apparatus of claim 14 further comprising a third side surface coupled to a third edge of the top mounting surface along a first edge of the third side surface at the angle relative to the top mounting surface.

16. The fire blocking apparatus of claim 15 further comprising a fourth side surface coupled to a fourth edge of the top mounting surface along a first edge of the fourth side surface at the angle relative to the top mounting surface.

17. The fire blocking apparatus of claim 16 wherein the angle relative to the top mounting surface is dimensioned to configure the first, second, third, and fourth side surfaces at right angles relative to the top mounting surface.

18. The fire blocking apparatus of claim 16 wherein the angle relative to the top mounting surface is dimensioned to configure the first, second, third, and fourth side surfaces outward at obtuse angles relative to the top mounting surface.

19. The fire blocking apparatus of claim 13 wherein the shelf surface is configured to accept ballast or fasteners to affix the fire blocking device to a roof surface.

* * * * *